United States Patent
April (10) Patent No.: US 9,241,004 B1
(45) Date of Patent: Jan. 19, 2016

(54) ALTERATION OF WEB DOCUMENTS FOR PROTECTION AGAINST WEB-INJECTION ATTACKS

(71) Applicant: Trend Micro Incorporated, Tokyo (JP)

(72) Inventor: Benjamin April, Amherst, NH (US)

(73) Assignee: Trend Micro Incorporated, Tokyo (JP)

( * ) Notice: Subject to any disclaimer, the term of this patent is extended or adjusted under 35 U.S.C. 154(b) by 43 days.

(21) Appl. No.: 14/204,319

(22) Filed: Mar. 11, 2014

(51) Int. Cl.
| | |
|---|---|
| H04L 29/06 | (2006.01) |
| G06F 17/30 | (2006.01) |
| G06F 21/60 | (2013.01) |
| G06F 17/22 | (2006.01) |
| G06F 21/12 | (2013.01) |
| H04L 29/12 | (2006.01) |
| G06F 17/21 | (2006.01) |
| H04L 29/08 | (2006.01) |
| G06F 21/14 | (2013.01) |
| G06F 12/14 | (2006.01) |

(52) U.S. Cl.
CPC .............. *H04L 63/14* (2013.01); *G06F 17/218* (2013.01); *G06F 17/2247* (2013.01); *G06F 21/128* (2013.01); *G06F 21/14* (2013.01); *G06F 21/60* (2013.01); *G06F 21/606* (2013.01); *H04L 61/2557* (2013.01); *H04L 63/0471* (2013.01); *H04L 63/145* (2013.01); *H04L 67/02* (2013.01); *H04L 67/42* (2013.01)

(58) Field of Classification Search
CPC ..... G06F 21/14; G06F 21/128; G06F 17/218; G06F 17/2247; G06F 21/60; G06F 21/606; G06F 2221/2119; H04L 63/0471; H04L 63/14; H04L 63/145; H04L 67/42; H04L 61/2557; H04L 63/0281; H04L 67/02
See application file for complete search history.

(56) References Cited

U.S. PATENT DOCUMENTS

| | | | | |
|---|---|---|---|---|
| 6,931,532 | B1 * | 8/2005 | Davis | G06F 21/6209 380/273 |
| 6,981,217 | B1 * | 12/2005 | Knauft | G06F 17/30864 707/999.001 |
| 8,806,627 | B1 * | 8/2014 | Aharoni et al. | 726/22 |
| 8,856,869 | B1 * | 10/2014 | Brinskelle | H04L 63/08 726/12 |
| 8,892,687 | B1 * | 11/2014 | Call | 709/217 |
| 8,893,294 | B1 * | 11/2014 | Steele et al. | 726/26 |
| 8,954,583 | B1 * | 2/2015 | Zhou et al. | 709/224 |
| 9,003,511 | B1 * | 4/2015 | Yang | 726/13 |
| 9,027,142 | B1 * | 5/2015 | Call et al. | 726/25 |

(Continued)

OTHER PUBLICATIONS

Byers, Simon, Aviel D. Rubin, and David Kormann. "Defending against an Internet-based attack on the physical world." ACM Transactions on Internet Technology (TOIT) 4.3 (2004): 239-254.*

(Continued)

*Primary Examiner* — Michael Simitoski
(74) *Attorney, Agent, or Firm* — Okamoto & Benedicto LLP (57) ABSTRACT

A web document protection module protects web documents against web-injection and other malicious attacks. The web document protection module may be implemented in a user computer, a proxy server computer system, a web server computer system, or other computers. The web document protection module receives a web document, such as a webpage, and alters the web document to change its structure. For example, the web document protection module may obfuscate the web document to make it difficult for malware to find locations in the web document to insert additional program code. The web document protection module provides the obfuscated web document to a web browser for rendering.

9 Claims, 5 Drawing Sheets

(56) References Cited

U.S. PATENT DOCUMENTS

| | | | |
|---|---|---|---|
| 2007/0294253 A1* | 12/2007 | Strub | H04L 63/105 |
| 2008/0222736 A1* | 9/2008 | Boodaei et al. | 726/27 |
| 2010/0299732 A1* | 11/2010 | Zhang et al. | 726/6 |
| 2011/0055391 A1* | 3/2011 | Schneider | 709/225 |
| 2011/0103394 A1* | 5/2011 | Vogt et al. | 370/401 |
| 2011/0131416 A1* | 6/2011 | Schneider | 713/172 |
| 2011/0131635 A1* | 6/2011 | Schneider | 726/5 |
| 2012/0066769 A1* | 3/2012 | Latchem | G06F 21/6245 726/26 |
| 2012/0124372 A1* | 5/2012 | Dilley et al. | 713/162 |
| 2013/0046995 A1* | 2/2013 | Movshovitz | H04L 9/0618 713/189 |
| 2013/0067225 A1* | 3/2013 | Shochet | G06F 21/6209 713/165 |
| 2013/0179985 A1* | 7/2013 | Strassmann | G06F 21/60 726/26 |
| 2014/0223290 A1* | 8/2014 | Hathaway | 715/235 |
| 2014/0237622 A1* | 8/2014 | Chang | G06F 21/54 726/27 |
| 2014/0281535 A1* | 9/2014 | Kane et al. | 713/168 |
| 2014/0283069 A1* | 9/2014 | Call et al. | 726/23 |
| 2015/0143117 A1* | 5/2015 | Freeman | H04L 63/0428 713/168 |

OTHER PUBLICATIONS

Bespoke 'web-inject' software-for-sale threatens bank chaos, Malware 'suites' sold cheap online, Jun. 26, 2012, by Beendare Seendat, 2 sheets [retrieved on Feb. 14, 2014], retrieved from the internet: http://news.techeye.net/security/bespoke-web-inject-software-for-sale-threatens-bank-chaos.

* cited by examiner

ALTERATION OF WEB DOCUMENTS FOR PROTECTION AGAINST WEB-INJECTION ATTACKS

BACKGROUND OF THE INVENTION

1. Field of the Invention

The present invention relates generally to computer security, and more particularly but not exclusively to methods and apparatus for protecting web documents against web-injection attacks.

2. Description of the Background Art

Figure 1:
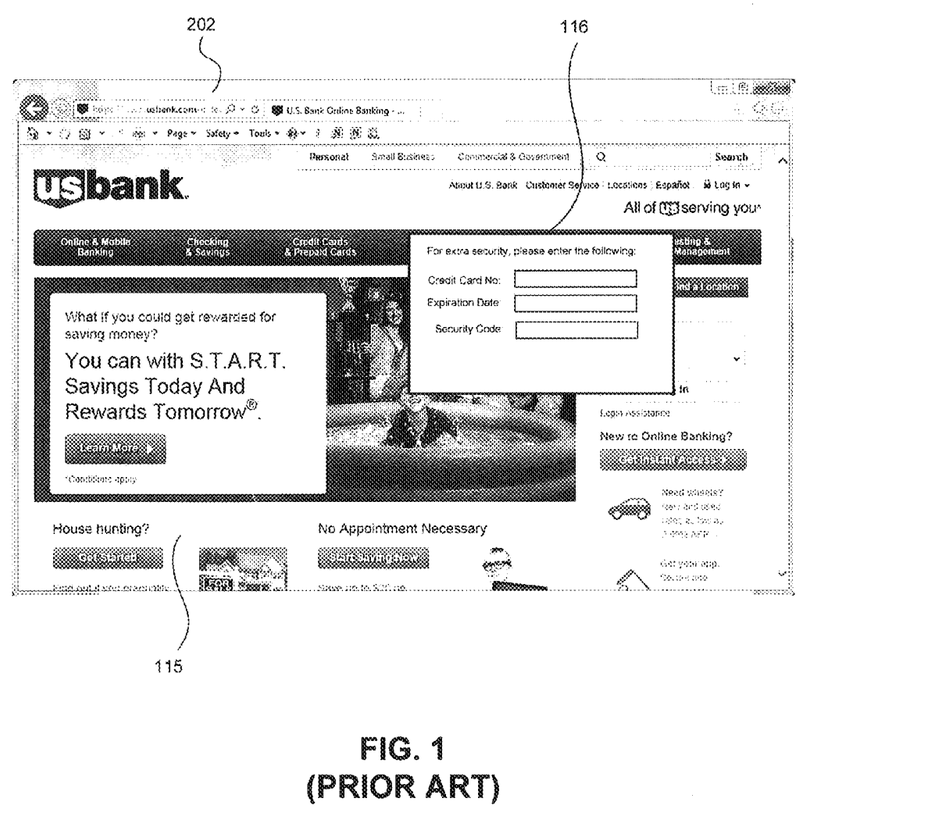
FIG. 1 schematically illustrates the effect of a web-injection attack on a webpage of an online bank.

Web documents, such as webpages, are susceptible to web-injection attacks. A web-injection attack is a man-in-the-middle attack where malware (e.g., computer virus) modifies a legitimate webpage to add malicious functionality. For example, the malware may inject malicious code into a webpage served by a web server of an online bank. When the webpage is rendered by a web browser, the malicious code executes to ask the user for additional information that is received by the malware rather than the online bank. This is schematically illustrated in FIG. 1, which shows a webpage 115 rendered by a web browser 202. In the example of FIG. 1, the message 116 is displayed by the malicious code injected by the malware into the webpage 115. Because the message 116 occurs in the middle of a transaction with the online bank, users may be fooled into believing that the online bank is asking for the additional information indicated in the message 116.

SUMMARY

In one embodiment, a web document protection module protects web documents against web-injection and other malicious attacks. The web document protection module may be implemented in a user computer, a proxy server computer system, a web server computer system, or other computers. The web document protection module receives a web document, such as a webpage, and alters the web document to change its structure. For example, the web document protection module may obfuscate the web document to make it difficult for malware to find locations in the web document to insert additional program code. The web document protection module provides the obfuscated web document to a web browser for rendering.

These and other features of the present invention will be readily apparent to persons of ordinary skill in the art upon reading the entirety of this disclosure, which includes the accompanying drawings and claims.

DESCRIPTION OF THE DRAWINGS

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 2:
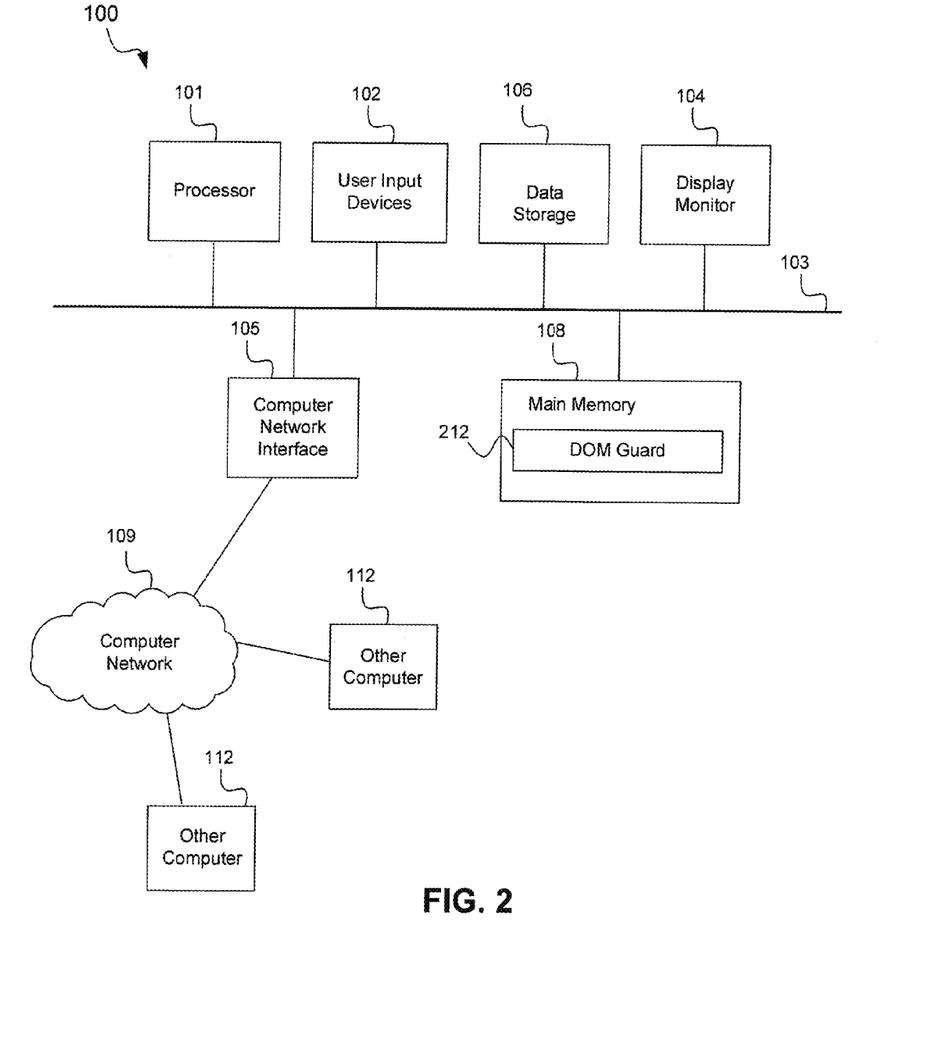
FIG. 2 shows a schematic diagram of a computer in accordance with an embodiment of the present invention.

Referring now to FIG. 2, there is shown a schematic diagram of a computer 100 in accordance with an embodiment of the present invention. The computer 100 may be employed as a user computer, a proxy server computer, or a web server computer, for example. The computer 100 may have fewer or more components to meet the needs of a particular application. The computer 100 may include one or more processors 101. The computer 100 may have one or more buses 103 coupling its various components. The computer 100 may include one or more user input devices 102 (e.g., keyboard, mouse), one or more data storage devices 106 (e.g., hard drive, optical disk, Universal Serial Bus memory), a display monitor 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet. The computer network interface 105 allows the computer 100 to communicate with other computers 112 over a private computer network or the Internet.

The computer 100 is a particular machine as programmed with software modules, which in the example of FIG. 2 includes a web document protection module in the form of a document object model (DOM) guard 212. As will be more apparent below, the DOM guard 212 protects a web document from web-injection and other attacks that maliciously modify a web document. The software modules of the computer 100 may include a web browser, web server, and/or other software modules depending on the configuration of the computer 100.

Generally speaking, software modules comprise computer-readable program code stored non-transitory in the main memory 108 for execution by the processor 101. The computer 100 may be configured to perform its functions by executing the software modules. The software modules may be loaded from the data storage device 106 to the main memory 108. An article of manufacture may be embodied as computer-readable storage medium including instructions that when executed by a computer causes the computer to be operable to perform the functions of the software modules.

Figure 3:
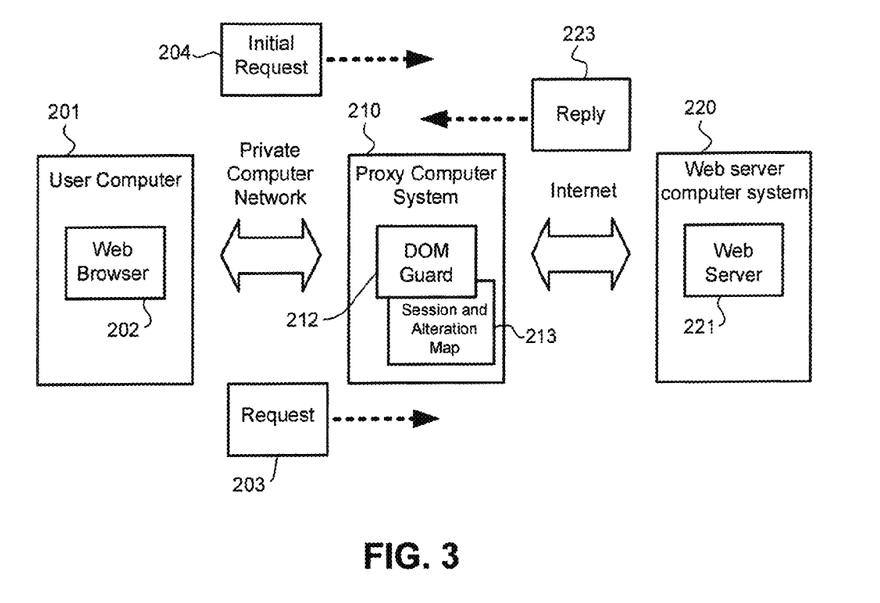
FIGS. 3-5 show schematic diagrams of computer systems for protecting web documents against web-injection and other malicious attacks in accordance with embodiments of the present invention.

FIG. 3 shows a schematic diagram of a computer system for protecting web documents, such as webpages, against web-injection and other malicious attacks in accordance with an embodiment of the present invention. The system includes the DOM guard 212, which protects webpages served by the web server 221 from web-injection attacks. In the example of FIG. 3, the DOM guard 212 is configured as a proxy running on a proxy server computer system 210, which is separate from the user computer 201 and the web server computer system 220. In another embodiment, the DOM guard 212 may be running on the user computer 201 (e.g., see FIG. 4). In yet another embodiment, the DOM guard 212 may be running on the web server computer system 220 (e.g., see FIG. 5).

The proxy server computer system 210, the user computer 201, and the web server computer system 220 may communicate over a computer network. In one embodiment, the user computer 201 and the proxy server computer system 210 communicate over a private computer network. In that embodiment, the proxy server computer system 210 may comprise one or more computers that serve as a gateway to the Internet through which all computer communications between the private computer network and the Internet pass through.

The user computer 201 may comprise a desktop, laptop, or other computer employed by a user to access a web document, which in this example is a webpage. The user computer 201 includes a commercially-available web browser 202. The web server computer system 220 may comprise one or more server computers that host a web server 221 of a website. The web server 221 may comprise computer-readable program code for serving one or more webpages to requesting user computers over the Internet. The web server 221 may be for online banking, e-commerce, or other online service.

In the example of FIG. 3, the DOM guard 212 serves as a proxy or works in conjunction with a proxy server to provide proxy service to the user computer 201. The DOM guard 212 accordingly receives requests for webpages (or other web documents) made by the user computer 201 to the web server computer system 220 or other computers on the Internet.

The DOM guard 212 may comprise computer-readable program code that receives a webpage from a web server, alters the webpage to protect the webpage from web-injection attacks, and provides the altered webpage to a web client. In the other direction, the DOM guard 212 receives requests from the web client and modifies the requests to restore back alterations made by the DOM guard 212 to webpages received in the same communication session.

The inventor believes that a typical malware (e.g., computer virus) that performs web-injection attacks uses regular-expression matching algorithms or takes advantage of the jQuery JAVASCRIPT library to find positions within a webpage to inject additional, malicious code. The additional code may comprise JAVASCRIPT code that when executed allows the attacker who deployed the malware to get a copy of login credentials. In other instances, the additional code generates a new field in an attempt to capture credit card verification value (CVV), personal identification number (PIN), and other confidential information. To inject the additional code in the proper location, the attacker is relying on a consistent webpage structure in which to place the additional code.

The DOM guard 212 may alter a webpage to reduce the likelihood that the injected additional code will properly function. The alteration may change elements of the webpage to change its structure. For example, by randomizing the names and identifications (IDs) of tags in a webpage, the DOM guard 212 makes each obfuscated webpage unique, even obfuscated webpages from a same original webpage. Because no two obfuscated webpages will have a similar structure to inject additional code into, the malware will need to find unique strings of text to match to be able to identify the proper location to inject the additional code or add commonly matched text in places that will not be visible to the user, making the web-injection attack much harder to successfully execute.

As a particular example, the DOM guard 212 may receive an original (i.e., pre-modification by the DOM guard 212) hypertext markup language (HTML) code of a webpage from the web server computer system 220. The DOM guard 212 may obfuscate the original webpage in a way that retains most of the look and feel and functionality of the original webpage. For example, the DOM guard 212 may rename tokens in the webpage, insert random elements in the webpage, or perform other obfuscation steps to alter the structure of the webpage. The DOM guard 212 may obfuscate a webpage in a variety of other ways including by field name substitution (i.e., replacing a field name with an equivalent field name), attribute order capitalization masking, DOM masking, field name prefix, image color/size adjustment, cross-site scripting (XSS)/SQL injection (SQLi) defense, etc.

Attribute order capitalization masking takes advantage of the fact that HTML parsers are very accepting of various styles of HTML. For example, the following HTML statements are identical to a web browser, and each is accordingly rendered the same way by the web browser:

<TABLE BORDER WIDTH=100%>
<table width="100%" border=1>
<Table Border="1" Width=100%>

The DOM guard 212 may thus randomize the capitalization of tag names and attribute names of a webpage, randomize the sequence of appearance of the tag names and attributed names in the webpage, and, in some cases, randomize the content of tag values to obfuscate and change the structure of the webpage. More specifically, the DOM guard 212 may change an HTML statement into an equivalent HTML statement and move the location of the HTML statement in a randomized fashion and still maintain the functionality as well as the look and feel of the webpage.

DOM masking involves wrapping a DOM object within an additional layer to prevent malware from successfully counting layers of the DOM model to find a target in a webpage. For example, assuming the webpage does not employ jQuery library, the DOM guard 212 may randomly decide on a per-element basis whether or not an element of a webpage should be wrapped in an additional layer of a DOM object. For example, the DOMG guard 212 may be configured to wrap an input field in a DIV tag with no properties.

Field name prefix may be employed in cases where the web server is not very advanced or the operator of the web server would like to minimize change impact on his website. With field name prefix, webpage field names that need to be protected may be prepended with a token, such as "_DOM_Guard_". The token indicates to the DOM guard 212 that the field name should be replaced with a randomly generated field name to obfuscate the webpage.

The aesthetic design of a webpage may include a number of image elements that expect precise alignment or color matching to a theme. Image color/size adjustment involves the DOM guard 212 resizing images of a webpage on a per communication session basis by appending transparent space and scaling such that only the HTML code of the webpage knows the size or scale alterations that will render a consistent webpage. The same may done with color information on a webpage. Images may have a "theme" color or a single RGB value that is known only to the web server and the DOM guard 212. The web server may instruct the DOM guard 212 to replace the "theme" color with either a specified color or a random selection from a pre-defined range. The color may also be selected by users as a security measure to positively identify their accounts or randomly selected so that web-injected code that changes the color of the webpage will alert the user that something is amiss.

The DOM guard 212 may also perform additional input validation and detection of XSS/SQLi attacks at points where the DOM guard 212 inserts random elements or renames fields, for example. The DOM guard 212 may perform input validation and detection using conventional algorithms without detracting from the merits of the present invention.

Webpages may also be protected from web-injection attacks by asset request defense. For example, when responding to the initial request for the webpage, the web server may specify in the headers of the webpage a list of additional assets that the web client might request. Some of these assets may not be needed by a webpage. When a web client requests an asset on the web server that is not expected to be part of the webpage being rendered, the web server may deem the request for the asset to be caused by malicious code that has been added by a web-injection attack. In that case, the web server may reply with a clearly incorrect image, such as a Jolly roger flag or "You are infected" banner to alert the user that his computer is infected with malware.

A test system (e.g., a web server computer system, proxy server computer system, or other computer system) may also be configured to periodically run tests of defined webpages. The test system renders and captures an image of an original webpage received from the web server as well as webpages that have been altered at various levels of obfuscation. Ideally, the visual representation of an obfuscated webpage should be no different from the original webpage. The testing may be used to both verify operation and maintain the most current protection against web-injection attacks.

In the example of FIG. 3, the DOM guard 212 is configured as a session-aware proxy. When the DOM guard 212 receives a Hypertext Transfer Protocol (HTTP) request from the web browser 202, the DOM guard 212 first checks to see if the request is part of a known communication session. The DOM guard 212 may create and maintain a communication session and alteration map 213 to keep track of communication sessions and alterations made to a webpage in a particular communication session. The DOM guard 212 may create a new communication session with corresponding entry in the map 213 when the request is not part of a known communication session. The DOM guard 212 may generate a random nonce that may be used to identify a particular communication session throughout the life of the particular communication session. Because the request is for a new communication session in this example, the DOM guard 212 simply forwards the request to the web server 221 without modifying or doing any processing to the request.

The first request sent by a web client to a web server in a new communication session is also referred to herein as the "initial request." FIG. 3 shows the initial request 204 sent by the web browser 202 to the web server 221. The DOM guard 212 receives the initial request 204, and forwards the initial request 204 to the web server 221 without modification. In the example of FIG. 3, the initial request 204 is an HTTP request for a webpage.

The web server 221 responds to the initial request 204 by sending a reply 223, which in this example is a webpage comprising HTML code. Upon receiving the reply 223, the DOM guard 212 inspect the headers of the HTML code to look for any DOM guard markers, such as particular headers or field name prefixes, that may be used as a guide in the obfuscation process. The DOM guard 212 may then inspect the HTML code of the webpage for tokens eligible for renaming and, if enabled, for suitable locations for random element injection, or other obfuscation steps. After altering the webpage to obfuscate and change its structure, the DOM guard 212 forwards the obfuscated webpage to the user computer 201.

In the user computer 201, the web browser 202 receives and renders the obfuscated webpage. Rendering of the obfuscated webpage may require the loading of additional files, which are also routed through the proxy server computer system 210. There, the DOM guard 212 may need to alter these additional files so that the entirety of the obfuscated webpage functions as expected. The alteration to these additional files may need to be performed at the Cascading Style Sheet (CSS) or JAVASCRIPT level, for example.

When a next request 203 is sent by the web browser 201, e.g., when the user fills out a form, the DOM guard 212 may inspect the HTML GET or POST data to look for alterations made by the DOM guard 212 to webpages in the same session. For example, that DOM guard 212 may consult the map 213 to identify altered field names, such as field names in the reply 223 that have been altered by the DOM guard 212 to obfuscate the reply 223. The DOM guard 212 restores the altered field names, and any other alterations made by the DOM guard 212, back to their original form as indicated in the map 213. More specifically, the DOM guard 212 maps back the original names of the altered field names before forwarding the request 203 to the web server 221 running in the web server computer system 220. The just described operations are repeated to the end of the session. As can be appreciated, the operations minimize the amount of modification to be made to the web server 221 to protect its webpages from web-injection attacks.

Figure 4:
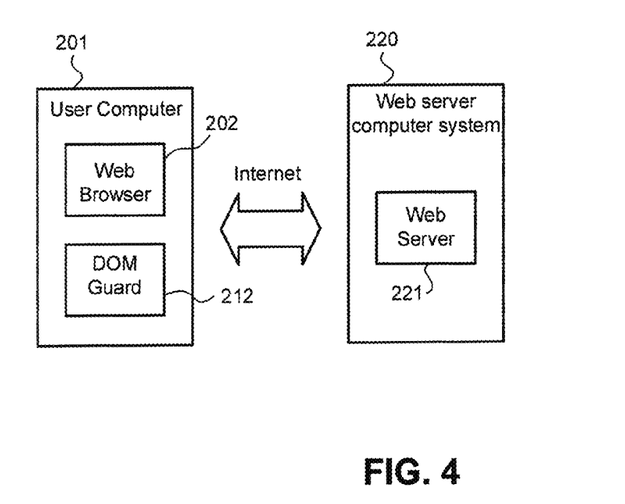

In the example of FIG. 3, the DOM guard 212 is configured as a proxy running in a proxy server computer system 210 that is separate from the user computer 201 and the web server computer system 220. In another embodiment, the DOM guard 212 is configured as a proxy running in the user computer 201 as illustrated in FIG. 4, which shows a schematic diagram of a computer system for protecting web documents from web-injection and other malicious attacks in accordance with another embodiment of the present invention. In the example of FIG. 4, the web browser 202 and the DOM guard 212 may communicate by inter-process communication on the same user computer 201, as opposed to over a computer network. The DOM guard 212 otherwise functions similarly in both FIG. 3 and FIG. 4. More specifically, in the example of FIG. 4, the DOM guard 212 receives a webpage sent by the web server 221 to the web browser 202, alters the webpage by obfuscating the webpage to generate an obfuscated webpage, and forwards the obfuscated webpage to the web browser 202. Similarly, the DOM guard 212 receives a request sent by the web browser 202 to the web server 221, restores elements in the request that have been altered by the DOM guard 212 in the same session, and forwards the restored request to the web server 221 over the Internet.

Figure 5:
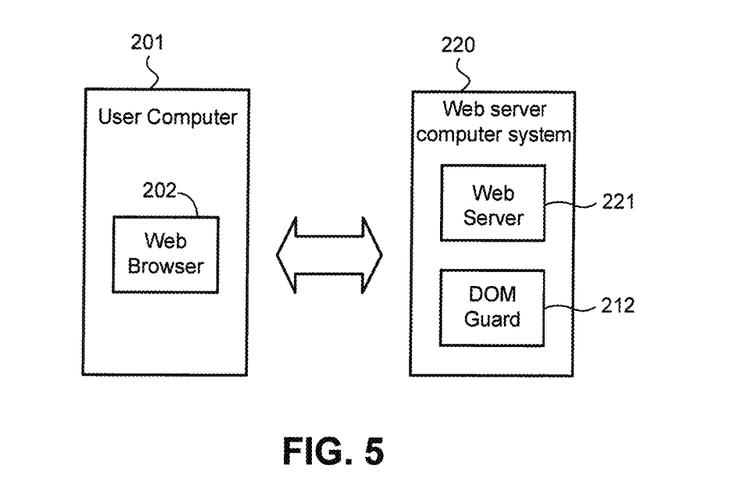

FIG. 5 shows a schematic diagram of a computer system for protecting web documents against web-injection and other malicious attacks in accordance with yet another embodiment of the present invention. In the example of FIG. 5, the DOM guard 212 and the web server 221 are running on the same web server computer system 220. In the example of FIG. 5, the web server 221 and the DOM guard 212 may communicate by inter-process communication, as opposed to over a computer network. In one embodiment, the DOM guard 212 may be configured as a plugin to the web server 221. For example, the DOM guard 212 may be implemented as a Ruby on Rails web server plugin that is called between the program code that is calling to render the webpage and the webpage that is being transmitted to the user computer 201. The plugin may be hooked at the point right after receiving the HTML Request or Post from the user computer before being parsed by the web server 221. The DOM guard 212 otherwise functions as previously described with reference to FIG. 3.

Figure 6:
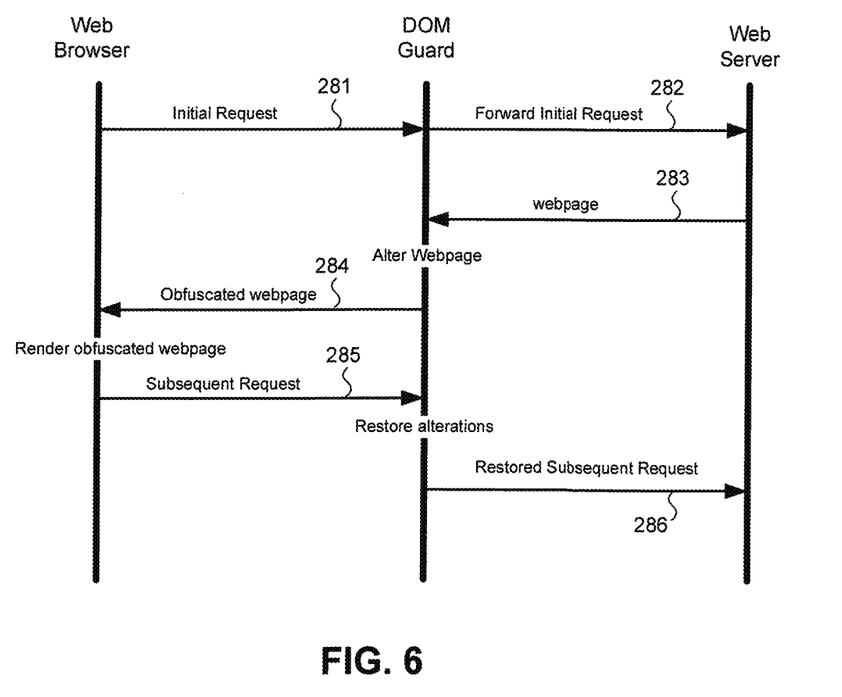
FIG. 6 shows a call diagram of a computer-implemented method of protecting web documents against web-injection attacks and other malicious attacks in accordance with an embodiment of the present invention.

FIG. 6 shows a call diagram of a computer-implemented method of protecting web documents against web-injection and other malicious attacks in accordance with an embodiment of the present invention. The method of FIG. 6 may be performed by previously described components. Other components may also be employed without detracting from the merits of the present invention.

In the example of FIG. 6, a web client in the form of the web browser 202 sends an initial request for a webpage to the web server 221 (arrow 281). A webpage protection module in the form of the DOM guard 212 receives the initial request (arrow 281). Because the initial request is a first HTTP request in a new communication session between the web browser 202 and the web server 221, the DOM guard 212 detects that the initial request is for an unknown communication session. Accordingly, the DOM guard 212 makes a note of the communication session, e.g., by creating a corresponding entry in a session and alteration map 213 (shown in FIG. 3). The DOM guard 212 forwards the initial request to the web server 221 without making any alteration to the initial request (arrow 282).

In response to the initial request, the web server 221 sends an HTTP reply in the form of a webpage (arrow 283). The DOM guard 212 alters the webpage to modify the structure of the webpage. The DOM guard 212 alters the webpage in a transparent manner, in a way that allows the web browser 202 to render the webpage as originally sent from the web server 221. In one embodiment, the DOM guard 212 alters the webpage by obfuscation, such as by changing one or more field names of the HTML code of the webpage to equivalent but different field names. In one embodiment, the obfuscation changes the structure of the webpage but not the webpage's functionality or look and feel, i.e., as if the webpage has been received directly from the web server 221 without alteration by the DOM guard 212. The DOM guard 212 thereafter sends the obfuscated webpage to the web browser 202 (arrow 284). The web browser 202 renders the obfuscated webpage.

In the same communication session, the web browser 202 sends a subsequent request to the web server 221 (arrow 285). The subsequent request may be the result of the user filling out a form presented by the obfuscated webpage, for example. The subsequent request may comprise an HTTP PUT or GET. The DOM guard 212 receives the subsequent request (arrow 285). The DOM guard 212 consults the session and alteration map 213 to determine that the subsequent request is part of an existing and known communication session between the web browser 202 and the web server 221, and to identify alterations made by the DOM guard 212 to webpages in the same communication session. The DOM guard 212 modifies the subsequent request to restore back the original elements or other webpage structures that have been altered by the DOM guard 212. For example, the DOM guard 212 may scan the subsequent request to identify altered field names and restore the altered field names back to their original names, i.e., as received from the web server 221. Thereafter, the DOM guard 212 sends the restored subsequent request to the web server 221 (arrow 286).

Figure 7:
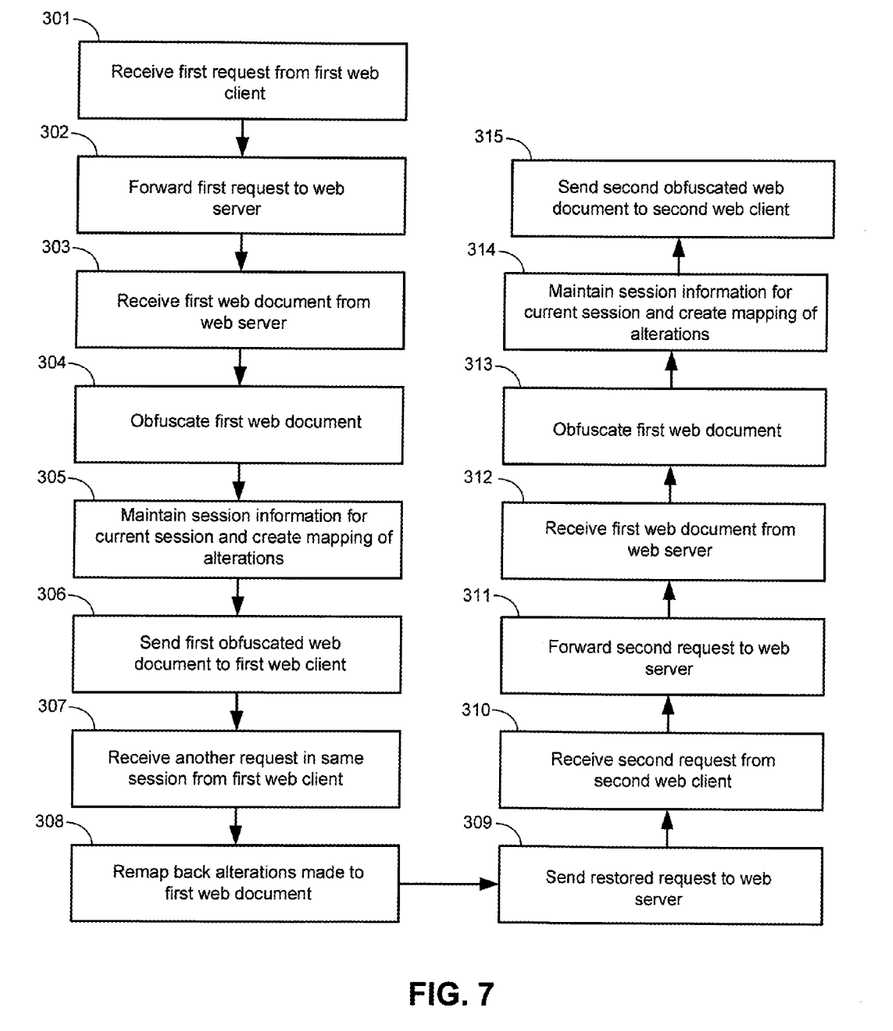
FIG. 7 shows a flow diagram of a computer-implemented method of protecting web documents against web-injection and other malicious attacks in accordance with an embodiment of the present invention.

FIG. 7 shows a flow diagram of a computer-implemented method of protecting web documents from web-injection and other malicious attacks in accordance with an embodiment of the present invention. The method of FIG. 7 may be performed by previously described components. Other components may be employed without detracting from the merits of the present invention.

In the example of FIG. 7, a web document protection module (e.g., a DOM guard) receives a first request from a first web client (e.g., a web browser) running in a first user computer (step 301). The web document protection module identifies the first request as an initial request in a new communication session between the first web client and a web server. Accordingly, the web document protection module forwards the first request to the web server without modifying the first request (step 302). The web document protection module subsequently receives a first web document from the web server (step 303). The first web document may comprise a webpage that is responsive to the first request. The web document protection module obfuscates the first web document (step 304). The web document protection module also maintains communication session information and creates a mapping of alterations made by the web document protection module to the first web document (step 305). The web document protection module sends the first obfuscated web document to the first web client (step 306).

Subsequently, the web document protection module receives another request from the first web client in the same communication session with the web server (step 307). The web document protection module identifies the subsequently received request from the first web client as part of a known communication session with the web server, and generates a restored request by modifying the request to re-map alterations made by the web document protection module on web documents received in the same communication session (step 308). The web document protection module thereafter sends the restored request to the web server.

The web document protection module may also receive a second request from a second web client (step 310). The second request may comprise a request for the same first web document from the web server in a new communication session. Because the second request is an initial request, the web document protection module simply forwards the second request to the web server without modifying the second request (step 311). The web server sends the first web document in response to the second request. The web document protection module receives the first web document from the web server (step 312) and obfuscates the first web document to generate a second obfuscated web document (step 313). The web document protection module may employ different obfuscation techniques in different communication sessions. This results in the same web document being obfuscated differently in different communication sessions. More specifically, the first obfuscated web document may be different from the second obfuscated web document even though both the first and second obfuscated web documents are from the same first web document. The web document protection module maintains communication session information and creates a mapping of alterations made by the web document protection module to the first web document to generate the second obfuscated web document (step 314). The web document protection module sends the second obfuscated web document to the second web client (step 315).

Methods and systems for protecting web documents against web-injection and other malicious attacks have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method comprising:

altering a webpage by prepending a webpage field name with a predetermined token to generate an altered webpage;

receiving a first hypertext transfer protocol (HTTP) request from a web browser running in a client computer in a communication session;

creating mapping information for the communication session in response to identifying the communication session for the first HTTP request as being a new communication session;

receiving the altered webpage from a web server responding to the HTTP request;

scanning a hypertext markup language (HTML) code of the altered webpage for the predetermined token;

in response to identifying the predetermined token in the HTML code of the webpage, generating an obfuscated webpage by altering the webpage field name to an altered webpage field name;

adding the webpage field name and the altered webpage field name to the mapping information; and providing the obfuscated webpage to the web browser running in the user computer.

2. The computer-implemented method of claim 1, further comprising:

receiving a second hypertext transfer protocol (HTTP) request from the user computer;

in response to identifying the second HTTP request as being in a same communication session as the first HTTP request, inspecting the second HTTP request for the altered field name;

generating a restored HTTP request by consulting the mapping information to restore the altered field name back to the field name; and sending the restored HTTP request to the web server.

3. The computer-implemented method of claim 1, wherein the altered webpage is received over the Internet by a web document protection module that runs in a proxy server computer system, and the proxy server computer system sends the obfuscated webpage to the user computer over a computer network.

4. A computer-implemented method comprising:

altering a webpage by prepending a webpage field name of the webpage with a predetermined token to generate an altered webpage;

receiving an initial request from a user computer running a web client in a first communication session, the initial request being a request for the altered webpage;

creating mapping information in response to identifying the first communication session as a new communication session;

forwarding the initial request to a web server;

receiving the altered webpage from the web server a first time in response to the initial request;

scanning the altered webpage for the predetermined token;

in response to identifying the predetermined token in the altered webpage, altering the webpage field name to an altered webpage field name to generate a first obfuscated webpage;

adding the webpage field name and the altered webpage field name to the mapping information; and sending the first obfuscated webpage to the user computer.

5. The computer-implemented method of claim 4, further comprising:

receiving a subsequent request from the user computer;

modifying the subsequent request by consulting the mapping information to restore the altered webpage field name back to the webpage field name to generate a restored request; and sending the restored request to the web server.

6. The computer-implemented method of claim 4, further comprising:

receiving the altered webpage a second time over the Internet, the altered webpage being received in response to another initial request in a second communication session that is different from the first communication session;

obfuscating the webpage to generate a second obfuscated webpage that is different from the first obfuscated webpage; and sending out the second obfuscated webpage.

7. A system comprising:

a user computer that runs a web browser and sends an initial hypertext transfer protocol (HTTP) request for an altered webpage;

a web server computer system that generates the altered webpage by prepending a webpage field name with a predetermined token, and hosts a web server that serves the altered webpage in response to the initial HTTP request; and a proxy server computer system that receives the initial HTTP request from the user computer, creates mapping information in response to identifying the initial HTTP request as being in a new communication session, forwards the initial HTTP request to the web server computer system, receives the altered webpage a first time over the Internet, scans the altered webpage for the predetermined token, alters the webpage field name to generate an altered webpage field name to generate an obfuscated webpage; adds the webpage field name and the altered webpage field name to the mapping information; and sends the obfuscated webpage to the user computer.

8. The system of claim 7, wherein the proxy server computer system receives a subsequent HTTP request from the user computer, modifies the subsequent HTTP request by restoring the altered webpage field name back to the webpage field name to generate a restored HTTP request, and sends the restored HTTP request to the web server computer system.

9. The system of claim 7, wherein the proxy server computer system receives a subsequent HTTP request from the user computer, consults the mapping information to identify one or more alterations made to the obfuscated webpage, modifies the subsequent HTTP request to restore the altered webpage field name back to the webpage field name to generate a restored HTTP request, and sends the restored HTTP request to the web server.

* * * * *